United States Patent [19]

Meijer et al.

[11] Patent Number: 4,994,004
[45] Date of Patent: Feb. 19, 1991

[54] ELECTRIC ACTUATOR FOR SWASHPLATE

[75] Inventors: Roelf J. Meijer; Robert P. Verhey, both of Ann Arbor, Mich.

[73] Assignee: Stirling Thermal Motors, Inc., Ann Arbor, Mich.

[21] Appl. No.: 277,773

[22] Filed: Nov. 30, 1988

[51] Int. Cl.$^5$ ............................................. F16H 35/08
[52] U.S. Cl. .................................. 475/149; 74/839
[58] Field of Search ............... 74/800, 801, 803, 839, 74/840, 60; 91/504–506; 92/71; 475/149, 162, 163

[56] References Cited

U.S. PATENT DOCUMENTS

| | | | |
|---|---|---|---|
| 810,444 | 1/1906 | Theil | 74/803 X |
| 1,348,539 | 8/1920 | Breitenbach | 475/149 |
| 2,955,487 | 10/1960 | Malley | 74/803 |
| 3,387,688 | 6/1968 | Yoshihara | 74/800 X |
| 3,705,522 | 12/1972 | Ogawa | 74/803 |
| 4,210,066 | 7/1980 | Aldrich | 91/506 |
| 4,258,590 | 3/1981 | Meijer et al. | 74/839 |
| 4,454,779 | 6/1984 | Vos | 74/60 |
| 4,532,855 | 8/1985 | Meijer et al. | 92/71 |
| 4,612,999 | 9/1986 | Bergler | 74/60 X |
| 4,815,327 | 3/1989 | Drevet | 74/839 X |

FOREIGN PATENT DOCUMENTS

| | | | |
|---|---|---|---|
| 2252355 | 5/1973 | Fed. Rep. of Germany | 91/506 |
| 2916796 | 11/1979 | Fed. Rep. of Germany | 74/839 |
| 367144 | 6/1939 | Italy | 74/803 |
| 85/00859 | 2/1985 | PCT Int'l Appl. | 74/803 |

*Primary Examiner*—Dwight Diehl
*Attorney, Agent, or Firm*—Harness, Dickey & Pierce

[57] ABSTRACT

An actuating mechanism for controlling the swashplate angle in a Stirling cycle engine or other engine having parallel reciprocating pistons. The actuation system uses an electric motor for changing swashplate angle. Various embodiments for gear trains for communicating rotation of the electric motor rotor to the swashplate are described. In a first embodiment, a planet gear carrier is driven by the motor and the planet gears simultaneously mesh with two ring gears having a differing number of teeth. Rotation of the carrier creates a high reduction drive for the second ring gear. In accordance with a second embodiment, the ring gear carrier is permitted to freely rotate and a driving sun gear is provided which meshes with the planet gears. In accordance with a third embodiment, the planet gear carrier is driven and the planet gears have two different diameter sections which mesh with the two ring gears, thus avoiding the high friction associated with a mismatching of the teeth of the planet gear and ring gears of the first and second embodiments. The fourth embodiment combines the features of the second and third embodiment configurations.

10 Claims, 5 Drawing Sheets

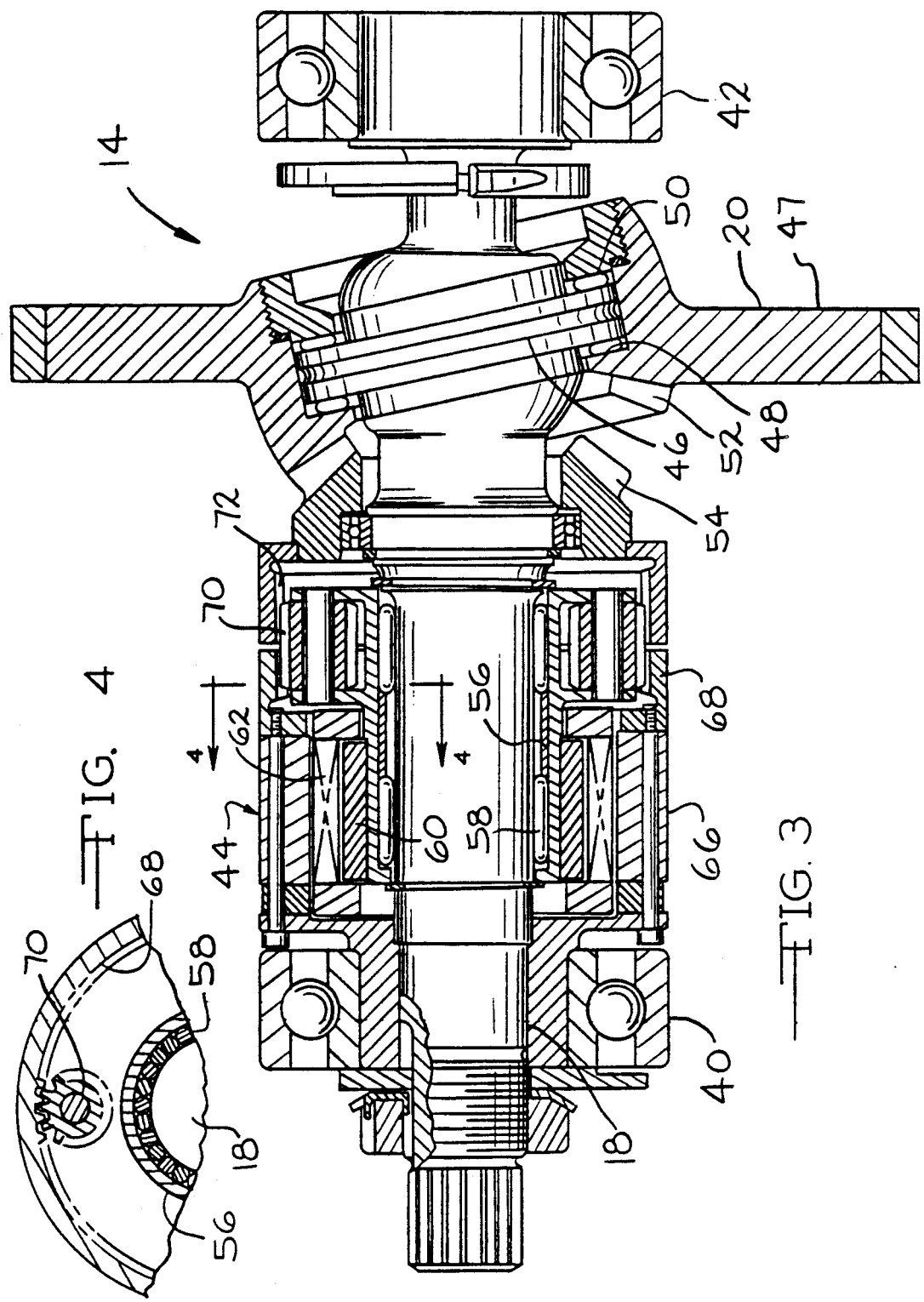

ELECTRIC ACTUATOR FOR SWASHPLATE

BACKGROUND AND SUMMARY OF THE INVENTION

This invention relates to a mechanical actuating mechanism and particularly to an electrically driven system for adjusting the swashplate angle of a parallel type Stirling cycle engine.

In one type of Stirling cycle engine, a swashplate is journaled for rotation within the engine housing. The swashplate is driven by crossheads (or vice versa) which are connected to reciprocating pistons. The swashplate, in turn, is coupled to a drive shaft for mechanical power transfer. As a means of varying the input or output of the machine, a variable swashplate angle mechanism can be employed which varies the stroke of the pistons.

Stirling Thermal Motors, Inc., assignee of the present invention has previously designed and implemented actuator systems for a variable angle swashplate which uses a hydraulic motor to control swashplate angle. Although such actuators operate satisfactorily, they require intricate fluid control systems for accurate adjustment of swashplate position. Another disadvantage of hydraulically driven actuators is the requirement that a precisely controlled hydraulic pressure must be applied continuously during operation of the device. There is accordingly a need in the art to provide an improved variable angle swashplate actuating mechanism which avoids the above mentioned shortcomings of present designs.

In accordance with the present invention, a number of embodiments of electrically driven swashplate actuation systems are described. For each embodiment, a different transmission is used to communicate rotation of an electric drive motor to the swashplate unit. Die to the high reduction gearing used to drive the swashplate, sufficient friction is present to prevent back driving of the gear train, thus avoiding a requirement for continuous energization of the actuator motor.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a view similar to FIG. 2 except showing the swashplate driven to a minimum displacement condition.

FIG. 4 is a partial cross-sectional view taken through the planet gear of the drive system shown in FIG. 3.

DETAILED DESCRIPTION OF THE INVENTION

Figure 1:
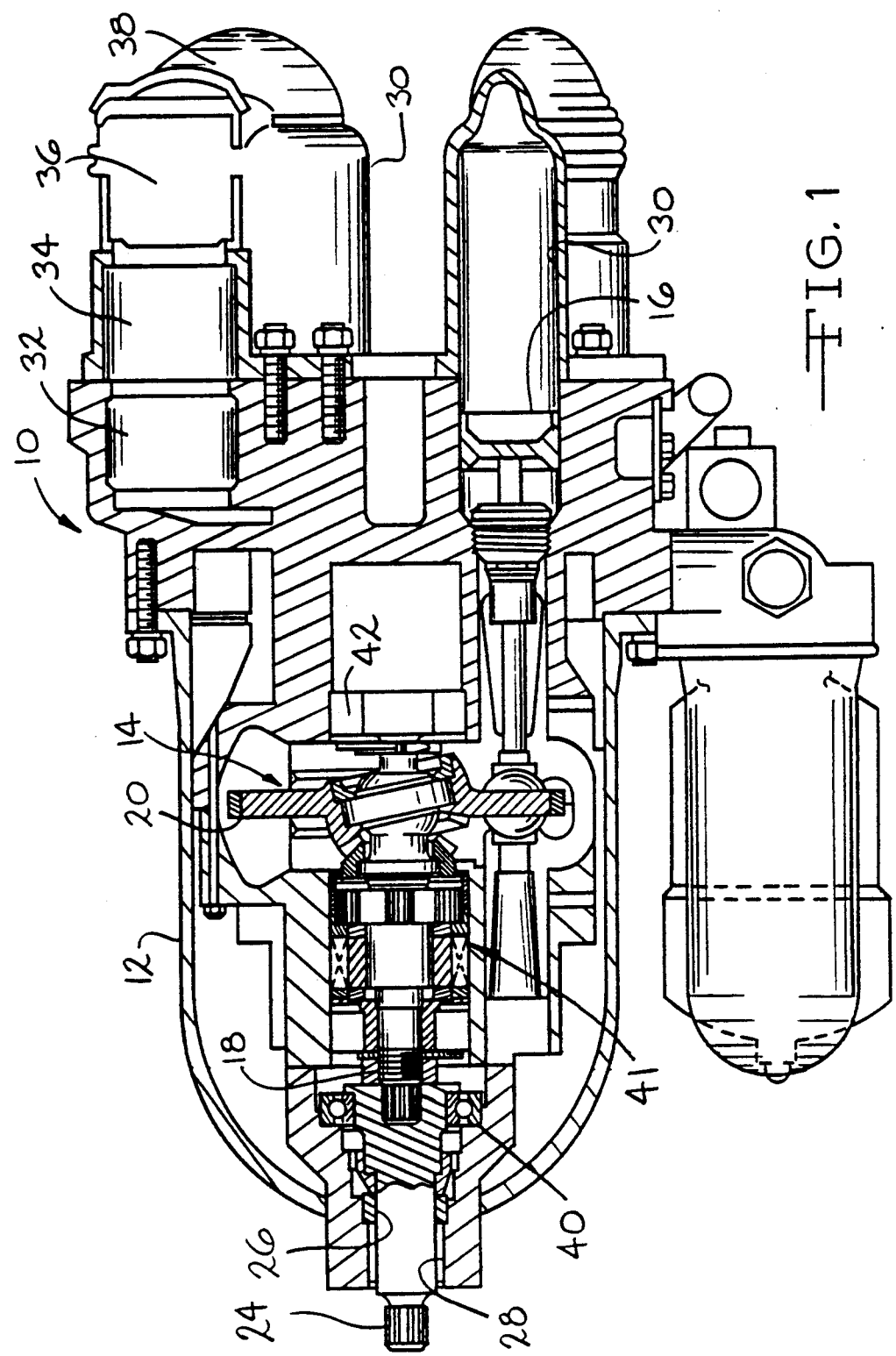
FIG. 1 is a longitudinal cross-sectional view taken through an exemplary Stirling cycle engine incorporating a swashplate actuator assembly in accordance with a first embodiment of this invention.

FIG. 1 illustrates a representative thermal engine 10 embodying principles of the present invention. Engine 10 includes a housing structure 12 which contains an operating mechanism 14 for converting the reciprocating motion of pistons 16 into rotation of drive shaft 18. Operating mechanism 14 includes a swashplate 20 carried by shaft 18 which is journaled in housing structure 12 for rotation. Stub shaft 24 engages drive shaft 18 through spines and is segmented in this manner to isolate bending loads exerted on swashplate 20 from stub shaft 24, thus preventing fluid leakage through stub shaft port 28 in accordance with the disclosure of applicant's previously issued U.S. Pat. No. 4,532,855, which is hereby incorporated by reference.

Engine 10 contains a number of substantially parallel cylinders 30 arranged in a square cluster. Associated with each cylinder 30 and parallel thereto is a heat exchanger stack comprising cooler 32, regenerator 34 and flexible heat exchanger 36. A short rigid hot connecting duct 38 connects cylinder 30 to heat exchanger 36.

Now with particular reference to FIGS. 1 and 2, the configuration of swashplate 20 and its actuating mechanism 44 will be described in detail. Drive shaft 18 is journaled for rotation by bearings 40 and 42 and includes a peripheral flange 46 formed on a plane inclined from the longitudinal axis of the shaft. Swashplate 20 has an annular internal cavity 48 with bearings 50 acting on flange 46. Relative rotation of swashplate 20 with respect to flange 46 causes the angle of inclination of swashplate flange 47 to the shaft's longitudinal axis to be varied. Swashplate 20 has bevel gear 52 which meshes with gear 54 to control relative rotation between drive shaft 18 and the swashplate, thereby enabling the swashplate angle to be varied. FIG. 3 represents actuating mechanism 44 driven to a low displacement position with swashplate flange 47 normal to the drive shaft axis.

Figure 2:
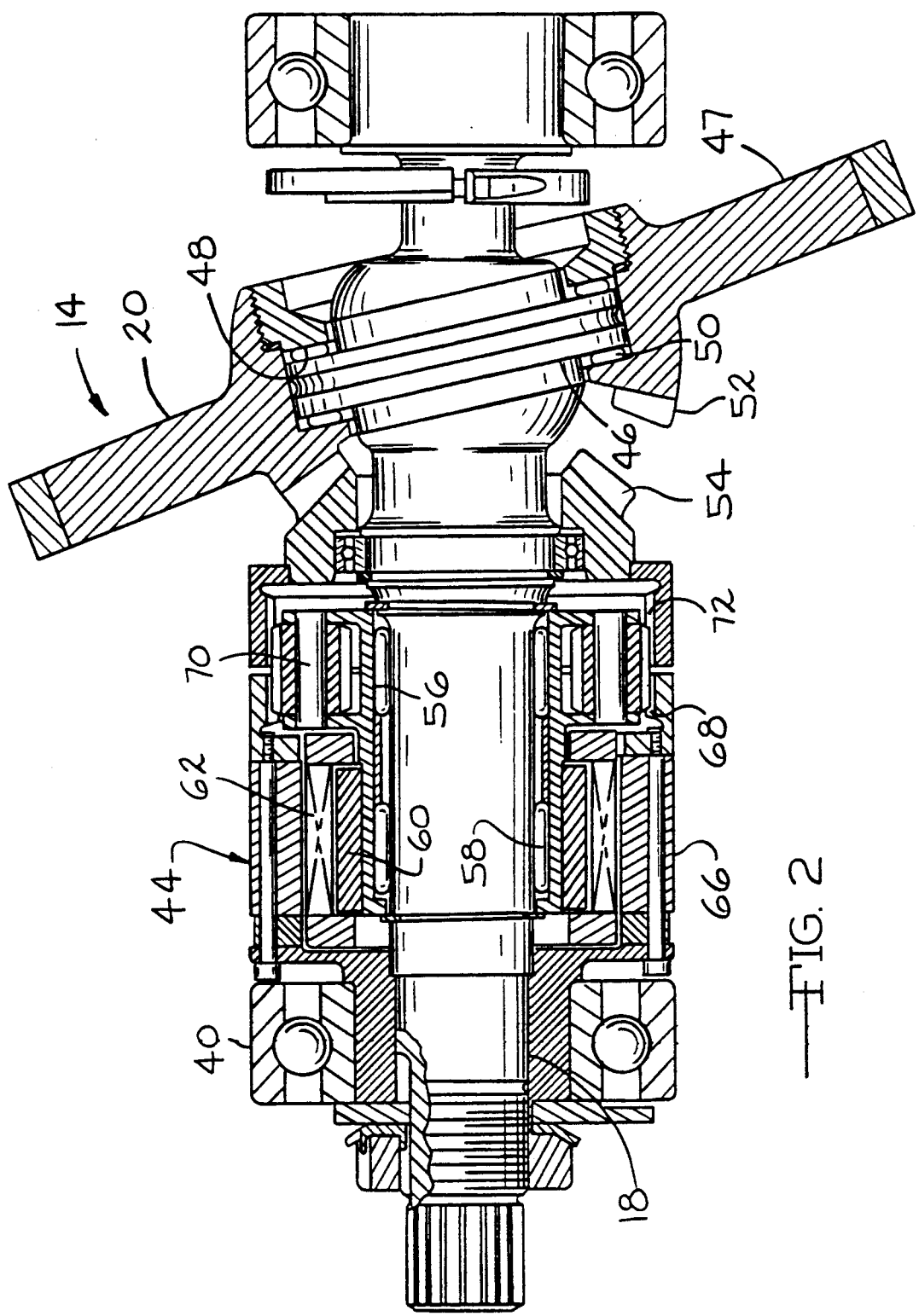
FIG. 2 is an enlarged longitudinal cross-sectional view of the swashplate and actuator mechanism shown in FIG. 1 at a first position which places the swashplate at a maximum displacement condition.

FIG. 2 represents a first embodiment of a swashplate actuating mechanism 44 according to this invention. Carrier sleeve 56 is journaled around shaft 18 and is rotatable with respect to the shaft on bearings 58. Carrier sleeve 56 forms the rotor of the electric drive motor with permanent magnets 60 attached thereto. The motor windings 62 are carried by frame 66 which is rigidly attached to drive shaft 18. Slip rings (not shown) are used to communicate electrical current to windings 62. Frame 66 forms a fixed ring gear 68 (relative to shaft 18) which meshes with one or more (preferably three) planet gears 70 carried for rotation by carrier sleeve 56. Movable ring gear 72 also meshes with planet gears 70 and is journaled for rotation with respect to drive shaft 18 and is directly connected to bevel gear 54. In order to provide a gear reduction, fixed ring gear 68 has a different number of teeth than movable ring gear 72.

In operation, energization of windings 62 causes carrier sleeve 56 to rotate with respect to drive shaft 18. Such rotation causes planet gears 70 to rotate within fixed ring gear 68. Due to the difference in the number of teeth of ring gears 68 and 72, ring gear 72 rotates slowly with respect to ring gear 68 which provides a high gear reduction. The gear reduction and the friction inherent in such a drive transmission prevents back driving and thus a set swashplate angle will be maintained without continuous energization of winding 62. By energizing winding 62 with an opposite polarity, the direction of movable ring gear 72 is reversed, enabling swashplate 20 to be moved between the positions shown in FIGS. 2 and 3. In order to monitor swashplate angle, external features can be provided on ring gears 68 and 72 which are detected as drive shaft 18 is rotated. The phase between the detected elements is related to swashplate angle.

Figure 5:
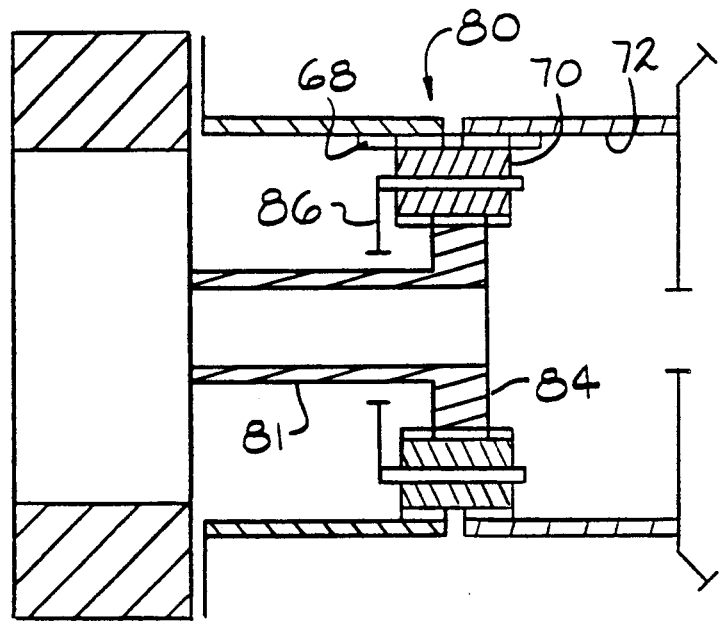
FIG. 5 is a schematic representation of a swashplate actuator mechanism according to a second embodiment of this invention in which a sun gear is driven by the drive motor.

With reference to FIG. 5, a second embodiment of a swashplate actuating mechanism according to this invention is shown and is generally designated by reference number 80. Actuating mechanism 80 is shown in pictorial fashion and elements which are common to those previously described are identified by like reference numbers. This embodiment differs from that described above in that sleeve 81 drives sun gear 84 which meshes with planet gears 70. Carrier 86 for planet gears 70 is journaled for free rotation with respect to sleeve 81. In operation, energization of the motor windings causes sun gear 84 to rotate, thus driving planet gears 70 in the manner of a conventional planetary gear set. Like the first embodiment, a difference in the number of teeth is provided for ring gears 68 and 72, causing relative rotation between them.

Figure 6:
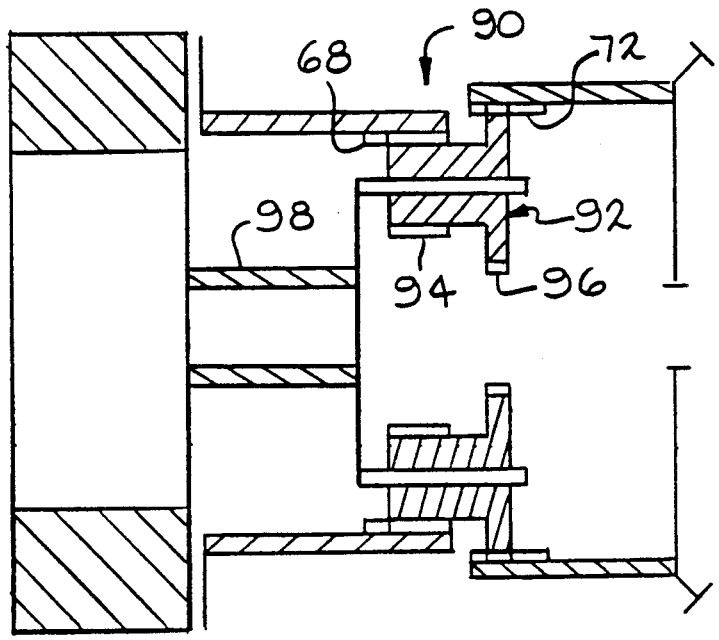
FIG. 6 is a pictorial representation of a third embodiment of the invention in which the gear train planet gear is divided into two sections having a differing number of teeth.

The embodiment of a swashplate actuating mechanism 90 shown in FIG. 6 differs from those described previously in that planet gears 92 form two different diameter gear sections 94 and 96, having differing numbers of teeth. Gear section 94 meshes with fixed ring gear 68 whereas gear section 96 meshes with movable ring gear 72. For this embodiment, planet gears 92 are driven by rotation of sleeve 98 like the first embodiment. The advantage of this design is that the pitch of the individual gear sections 96 and 94 can be precisely matched with those of the gear which they engage and thus avoids the meshing error which exists in the first and second embodiments which gives rise to high drive friction.

Figure 7:
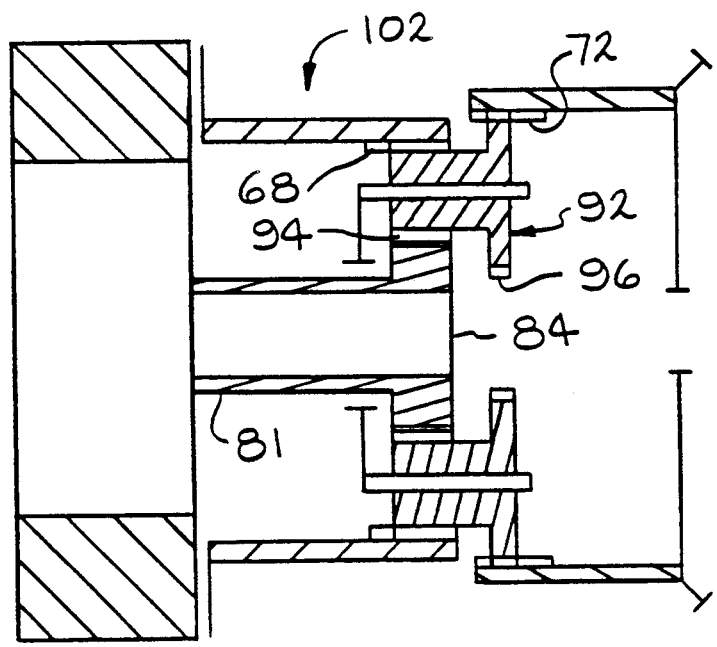
FIG. 7 is a pictorial representation of a fourth embodiment of this invention incorporating the modified features of the embodiments shown in FIGS. 5 and 6.

Swashplate actuating mechanism 102 shown in FIG. 7 combines the features of the embodiments shown in FIGS. 5 and 6. For this embodiment, planet gears 92 with gear sections 94 and 96 are used and planet gear carrier 86 is freely rotatable. Sun gear 84 meshes with planet gears 92 and drives the gear sections 94 and 96. Alternately, sun gear 84 could mesh with planet gear section 96. Like the earlier embodiments, rotation of the planet gears causes relative rotation between ring gears 68 and 72.

While the above description constitutes the preferred embodiments of the present invention, it will be appreciated that the invention is susceptible of modification, variation and change without departing from the proper scope and fair meaning of the accompanying claims.

We claim:

1. An actuating mechanism for a swashplate of a reciprocating thermal machine for varying the angle of inclination of said swashplate with respect to a drive shaft to thereby vary the displacement of pistons coupled to said swashplate, comprising:
    a first ring gear fixed with respect to said drive shaft for rotation therewith,
    at least one planet gear meshing with said first ring gear,
    a second ring gear meshing with said planet gear and having a different number of teeth than said first ring gear,
    coupling means for coupling said second ring gear to said swashplate whereby rotation of said second ring gear with respect to said drive shaft rotates said swashplate with respect to said drive shaft thereby changing said swashplate angle, and
    electric motor means fixed with respect to said drive shaft for rotation therewith and driving said planet gears, said electric motor means causing said planet gears to rotate with respect to said drive shaft and drive said second ring gear.

2. An actuating mechanism according to claim 1 wherein said planet gear is journaled to a carrier and said motor means drives said carrier for rotation with respect to said drive shaft.

3. An actuating mechanism according to claim 1 further comprising a sun gear driven by said motor means and meshing with said planet gear.

4. An actuating mechanism according to claim 1 wherein said planet gear has a uniform diameter in engagement with both said first and second ring gears.

5. An actuating mechanism according to claim 1 wherein said planet gear has first and second toothed gear sections of differing diameter with said first gear section meshing with said first ring gear and said second gear section meshing with said second ring gear.

6. An actuating mechanism for a swashplate of a reciprocating thermal machine for varying the angle of inclination of said swashplate with respect to a drive shaft to thereby vary the displacement of pistons coupled to said swashplate, comprising:
    a frame surrounding said drive shaft and fixed thereto and rotating with said drive shaft, said frame defining an annular cavity surrounding said drive shaft and further defining an internally toothed first ring gear, said first ring gear also rotating with said drive shaft,
    an electric motor stator disposed within said annular cavity and fixed to said frame for rotation with said drive shaft
    an electric motor rotor disposed within said annular cavity and journaled for relative rotation with respect to said drive shaft,
    at least one planet gear meshing with said first ring gear,
    a second ring gear meshing with said planet gear and having a different number of teeth than said first ring gear providing a gear reduction between said first ring gear and said second ring gear,
    coupling means for coupling said second ring gear to said swashplate whereby rotation of said second ring gear with respect to said drive shaft rotates said swashplate with respect to said drive shaft thereby changing said swashplate angle, and
    driving means for coupling said motor rotor with said planet gear.

7. An actuating mechanism according to claim 6 wherein said planet gear is journaled to a carrier and said motor rotor drives said carrier for rotation with respect to said drive shaft.

8. An actuating mechanism according to claim 6 further comprising a sun gear driven by said motor rotor and meshing with said planet gear.

9. An actuating mechanism according to claim 6 wherein said planet gear has a uniform diameter in engagement with both said first and second ring gears.

10. An actuating mechanism according to claim 6 wherein said planet gear has first and second toothed gear sections of differing diameter with said first gear section meshing with said first ring gear and said second gear section meshing with said second ring gear.

* * * * *